(12) United States Patent
Ryskamp et al.

(10) Patent No.: US 12,495,126 B2
(45) Date of Patent: Dec. 9, 2025

(54) VIDEO BUBBLES DURING DOCUMENT EDITING

(71) Applicant: Zoom Video Communications, Inc., San Jose, CA (US)

(72) Inventors: Robert Allen Ryskamp, Mountainview, CA (US); Adam Justin Spooner, Greensboro, NC (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/875,716

(22) Filed: Jul. 28, 2022

(65) Prior Publication Data

US 2024/0040083 A1 Feb. 1, 2024

(51) Int. Cl.
*H04N 7/15* (2006.01)
*G06F 40/166* (2020.01)

(52) U.S. Cl.
CPC .......... *H04N 7/152* (2013.01); *G06F 40/166* (2020.01)

(58) Field of Classification Search
CPC .................................................. H04N 7/152
See application file for complete search history.

(56) References Cited

U.S. PATENT DOCUMENTS

| | | | |
|---|---|---|---|
| 10,440,325 B1 | 10/2019 | Boxwell et al. | |
| 11,317,060 B1 | 4/2022 | Libin | |
| 11,463,499 B1 | 10/2022 | Fieldman | |
| 11,483,170 B1 * | 10/2022 | Carbune et al. | .... H04L 12/1831 |
| 11,614,854 B1 * | 3/2023 | Fitch et al. | ........... G06F 3/0484 |
| 11,949,722 B1 | 4/2024 | Mavuduri | |
| 2014/0365396 A1 | 12/2014 | Kumar et al. | |
| 2018/0011627 A1 | 1/2018 | Siracusano | |
| 2020/0412780 A1 | 12/2020 | Devendran et al. | |
| 2022/0191258 A1 | 6/2022 | Sharp et al. | |
| 2023/0068117 A1 * | 3/2023 | Johnston et al. | |
| 2023/0083688 A1 * | 3/2023 | Janakiraman et al. | ....................... H04L 65/403 |
| 2023/0208894 A1 * | 6/2023 | Litsuka et al. | ...... H04L 65/4015 |
| 2023/0300295 A1 | 9/2023 | Tangeland et al. | |

(Continued)

OTHER PUBLICATIONS

U.S. Appl. No. 17/875,711; Non-Final Office Action dated Apr. 17, 2023, 24 pages.

(Continued)

*Primary Examiner* — James J Debrow
(74) *Attorney, Agent, or Firm* — Kilpatrick Townsend & Stockton LLP

(57) ABSTRACT

Systems and methods for providing video bubbles during document editing are provided herein. In an aspect, a system comprising: a non-transitory computer-readable medium; a communications interface; and a processor communicatively coupled to the non-transitory computer-readable medium and the communications interface is provided. The processor may be configured to execute processor-executable instructions stored in the non-transitory computer-readable medium to: transmit, from a first client device, a request to access a collaborative document; receive, by the first client device, access to the collaborative document; transmit, from the first client device, a first video stream; generate a first video bubble associated with the first video stream within the collaborative document; and provide, to a second client device, the collaborative document and the first video bubble.

18 Claims, 10 Drawing Sheets

(56) References Cited

U.S. PATENT DOCUMENTS

2023/0385768 A1* 11/2023 Akkerman ............ G06Q 10/101
2024/0184503 A1*  6/2024 Rothera et al. ....... G06F 3/1454

OTHER PUBLICATIONS

U.S. Appl. No. 17/875,711; Final Office Action dated Oct. 18, 2023, 33 pages.
U.S. Appl. No. 17/858,711, filed Jul. 28, 2022.
U.S. Appl. No. 17/875,711 , "Non-Final Office Action", Jun. 26, 2024, 28 pages.
U.S. Appl. No. 17/875,711, "Unpublished Application as Filed Jul. 28, 2022".
U.S. Appl. No. 17/875,711, "Final Office Action", Jan. 23, 2025, 33 pages.
U.S. Appl. No. 17/875,711, "Non-Final Office Action", Jun. 2, 2025, 34 pages.

* cited by examiner

VIDEO BUBBLES DURING DOCUMENT EDITING

CROSS-REFERENCE TO RELATED APPLICATIONS

This application is related to co-pending U.S. patent application Ser. No. 17/875,711, filed Jul. 28, 2022, titled "Video Bubbles During Document Editing."

FIELD

The present application generally relates to a collaborative document editing experience, and more particularly relates to systems and methods for providing video bubbles during document editing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
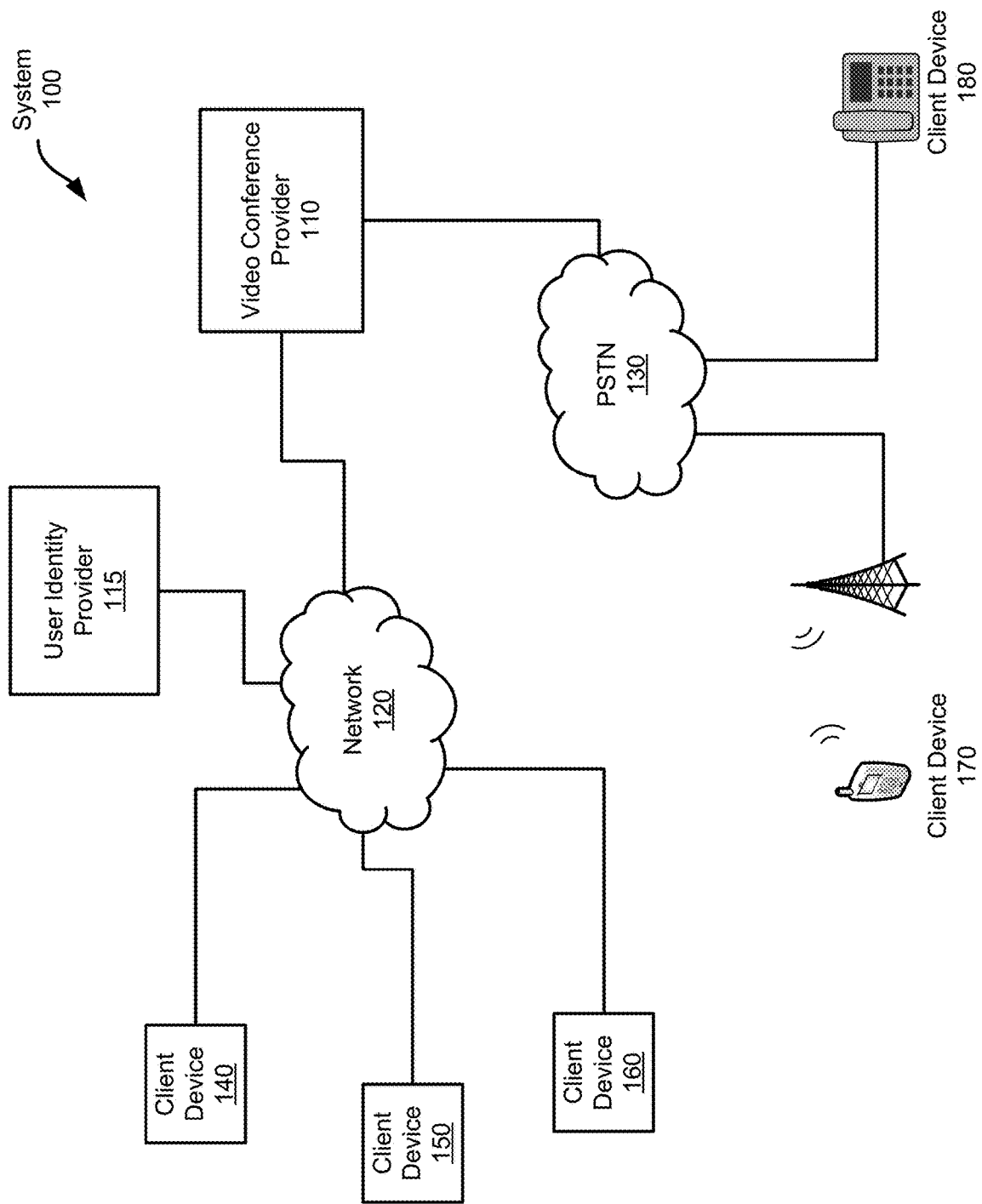
FIGS. 1, 2, and 3 show example systems for providing video bubbles during document editing, according to an embodiment herein.

Examples are described herein in the context of systems and methods for providing video bubbles during document editing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As the popularity of virtual meetings to replace conventional, in-person meetings, continues to rise, so too does the prevalence of collaborative document sharing. Collaborative document sharing often involves a single document that is shared with two or more participants who are invited to review, edit, and/or comment on the content of the collaborative document. Collaborative documents or collaborative documents allow participants to collaboratively work on a single document simultaneously, thereby producing a single product upon completion.

Collaborative documents can be shared during a virtual meeting to facilitate a discussion. Presently, when a document is shared during a virtual meeting the video streams from the meeting participants are provided around the perimeter of the collaborative document. For example, video streams are often allocated to a top bar of the meeting display when a document is shared. Moreover, if there are above a certain number of video streams (e.g., participants), only a few may be provided on the meeting display at a time. By reorganizing the video streams to the periphery of the meeting display and/or limiting the number of video streams provided on the display at a time, the collaborative document can become the primary focus of the meeting display. This configuration, however, can cause divided attention for meeting participants. That is, a participant cannot focus on the collaborative document and on a video stream of a presenting participant simultaneously.

To allow participants to maintain focus on the collaborative document without missing the content of the participants' video streams, examples of video bubbles are provided herein. Video bubbles may correspond to the video streams of the meeting participants and may provide the video streams of the meeting participants overlaid on the collaborative document. The video bubbles may move around the collaborative document in response to input from a participant's client device. For example, if a participant moves his or her cursor around the collaborative document, the video bubble may move around the collaborative document responsive to the cursor movement. Because the video bubbles provide the video streams of corresponding meeting participants, meeting participants can focus on the collaborative document while simultaneously viewing the video streams. For example, a meeting participant can look another participant in the eye while the participant makes a change to the collaborative document.

The video bubbles also allow for all the meeting participants to be present in the collaborative document experience. As noted above, when a document is shared, often only a certain number, such as two or three, video streams are provided on the meeting display to provide room for the collaborative document. Under this arrangement, the video streams of off-display participants are not visible to the meeting participants, thereby leaving the off-display participants out of the meeting display presence. In contrast, video bubbles can allow for all the participants to be present on the meeting display during a collaborative document experience. Because a video bubble may be generated for each video stream present in the virtual meeting, all meeting participants can be present during the collaborative document experience.

In some embodiments, a collaborative document may be shared with participants outside the context of a virtual meeting. For example, the collaborative document may be hosted by a video conference provider or third party server such that two or more participants can access and make edits to the collaborative document. Any changes or edits to the collaborative document may be stored to a single document. In such embodiments, when a participant accesses the collaborative document, a video bubble may be generated for the participant. The video bubble may include a video stream of the participant overlaid on the collaborative document. Thus, when more than one participant is on the collaborative document, the other participants can see each participant's video stream as edits are made to the collaborative document.

By providing the video bubbles during editing of a collaborative document, context can be provided for edits. For example, if a collaborative document is edited, a video bubble corresponding to the participant making the edits may be present near the edits as they are being made. This can provide additional context to the edits. In some embodiments, a recording of the video bubbles during the document editing may be made. The recording can allow participants to gain context for past edits to the document.

This illustrative example is given to introduce the reader to the general subject matter discussed herein and the disclosure is not limited to this example. The following sections describe various additional non-limiting examples and examples of systems and methods for providing video bubbles during document editing.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more participant identity providers, e.g., participant identity provider 115, which can provide participant identity services to participants of the client devices 140-160 and may authenticate participant identities of one or more participants to the video conference provider 110. In this example, the participant identity provider 115 is operated by a different entity than the video conference provider 110, though in some examples, they may be the same entity.

Figure 2:
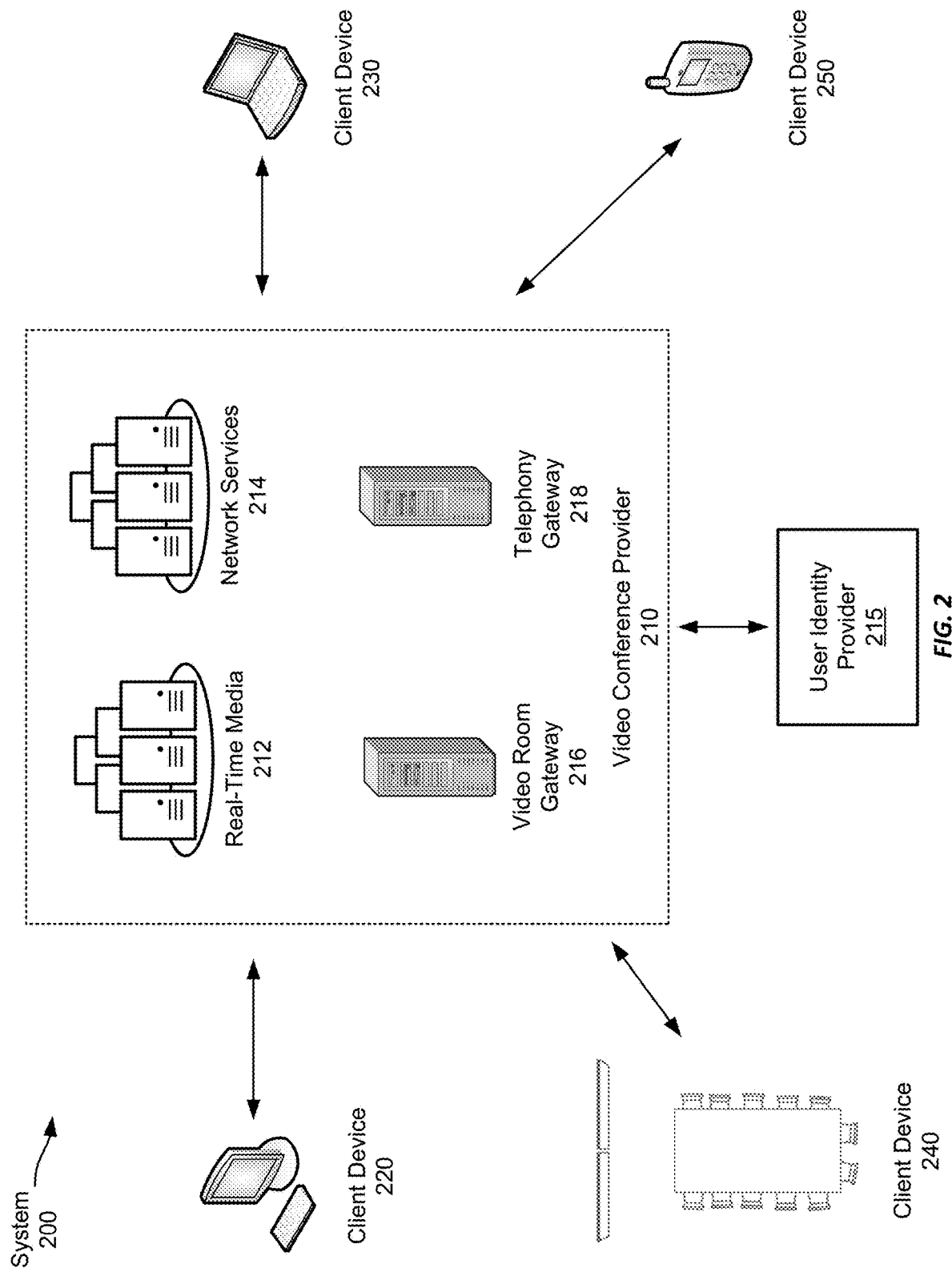

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage participant functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the video conference provider 110, a participant may contact the video conference provider 110 using a client device 140-180 and select an option to create a new meeting. Such an option may be provided in a webpage accessed by a client device 140-160 or client application executed by a client device 140-160. For telephony devices, the participant may be presented with an audio menu that they may navigate by pressing numeric buttons on their telephony device. To create the meeting, the video conference provider 110 may prompt the participant for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the participant may distribute the meeting information to one or more participants to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit participants to the meeting. Depending on the options set for the meeting, the participants may be admitted immediately upon providing the appropriate meeting identifier (and authentication information, as appropriate), even if the host has not yet arrived, or the participants may be presented with information indicating the that meeting has not yet started or the host may be required to specifically admit one or more of the participants.

During the meeting, the participants may employ their client devices 140-180 to capture audio or video information and stream that information to the video conference provider 110. They also receive audio or video information from the video conference provider 210, which is displayed by the respective client device 140 to enable the various participants to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. As discussed in detail below, in some embodiments, a first virtual meeting may terminate, thereby disconnecting only participants in that sidebar meeting. The virtual meeting may continue allowing participants therein to continue exchanging audio and video streams.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more participants to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a participant to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the participant to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide participant identification information, meeting identifiers, meeting passwords or passcodes, etc. In examples that employ a participant identity provider 115, a client device, e.g., client devices 140-160, may operate in conjunction with a participant identity provider 115 to provide participant identification information or other participant information to the video conference provider 110.

A participant identity provider 115 may be any entity trusted by the video conference provider 110 that can help identify a participant to the video conference provider 110. For example, a trusted entity may be a server operated by a business or other organization and with whom the participant has established their identity, such as an employer or trusted third-party. The participant may sign into the participant identity provider 115, such as by providing a username and password, to access their identity at the participant identity provider 115. The identity, in this sense, is information established and maintained at the participant identity provider 115 that can be used to identify a particular participant, irrespective of the client device they may be using. An example of an identity may be an email account established at the participant identity provider 110 by the participant and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a participant's "identity" relates to a secure, verified set of information that is tied to a particular participant and should be accessible only by that participant. By accessing the identity, the associated participant may then verify themselves to other computing devices or services, such as the video conference provider 110.

When the participant accesses the video conference provider 110 using a client device, the video conference provider 110 communicates with the participant identity provider 115 using information provided by the participant to verify the participant's identity. For example, the participant may provide a username or cryptographic signature associated with a participant identity provider 115. The participant identity provider 115 then either confirms the participant's identity or denies the request. Based on this response, the video conference provider 110 either provides or denies access to its services, respectively.

For telephony devices, e.g., client devices 170-180, the participant may place a telephone call to the video conference provider 110 to access video conference services. After the call is answered, the participant may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide participant identification information to identify the telephony device or the participant to the video conference provider 110. Thus, the video conference provider 110 may provide more limited functionality to such telephony devices. For example, the participant may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that participants may choose to participate in meetings anonymously and decline to provide participant identification information to the video conference provider 110, even in cases where the participant has an authenticated identity and employs a client device capable of identifying the participant to the video conference provider 110. The video conference provider 110 may determine whether to allow such anonymous participants to use services provided by the video conference provider 110. Anonymous participants, regardless of the reason for anonymity, may be restricted as discussed above with respect to participants employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some participants from participating in a meeting.

By using the example system shown in FIG. 1, participants can create and participate in meetings using their respective client devices 140-180 via the video conference provider 110. Further, such a system enables participants to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more participant identity providers 215, which can authenticate various participants to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a participant's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage participant accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a participant, e.g., a username and password or single sign-on credentials, to gain authenticated access to the video conference provider 210. This process may involve the network services servers 214 contacting a participant identity provider 215 to verify the provided credentials. Once the participant's credentials have been accepted, the network services servers 214 may perform administrative functionality, like updating participant account information, if the participant has an identity with the video conference provider 210, or scheduling a new meeting, by interacting with the network services servers 214.

In some examples, participants may access the video conference provider 210 anonymously. When communicating anonymously, a client device 220-250 may communicate with one or more network services servers 214 but only provide information to create or join a meeting, depending on what features the video conference provider allows for anonymous participants. For example, an anonymous participant may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a participant wishes to schedule a meeting, the participant (anonymous or authenticated) may select an option to schedule a new meeting and may then select various meeting options, such as the date and time for the meeting, the duration for the meeting, a type of encryption to be used, one or more participants to invite, privacy controls (e.g., not allowing anonymous participants, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various participants.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent participants requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another participant as the new meeting host and assign host administrative privileges to that participant. Hosts may have administrative privileges to allow them to manage their meetings, such as by enabling or disabling screen sharing, muting or removing participants from the meeting, assigning or moving participants to the mainstage or a breakout room if present, recording meetings, etc. Such functionality may be managed by the network services server(s) 214.

For example, if a host wishes to remove a participant from a meeting, they may identify the participant and issue a command through a participant interface on their client device. The command may be sent to a network services server 214, which may then disconnect the identified participant from the corresponding real-time media server 212. If the host wishes to remove one or more participants from a second meeting, such a command may also be handled by a network services server 214, which may terminate the authorization of the one or more participants for joining the sidebar meeting. In some embodiments, the host may wish to join one or more participants in a second meeting. The command to do so may be handled by a network services server 214, which may provide authorization information to the one or more participants to join the sidebar meeting and then connect the one or more participants to the sidebar meeting similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a participant later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a participant uses a telephony device to connect to a meeting, they may dial a phone number corresponding to one of the video conference provider's telephony gateway servers 218. The telephony gateway server 218 will answer the call and generate audio messages requesting information from the participant, such as a meeting ID and passcode. The participant may enter such information using buttons on the telephony device, e.g., by sending dual-tone multi-frequency ("DTMF") audio signals to the telephony gateway server 218. The telephony gateway server 218 determines the numbers or letters entered by the participant and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the participant of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
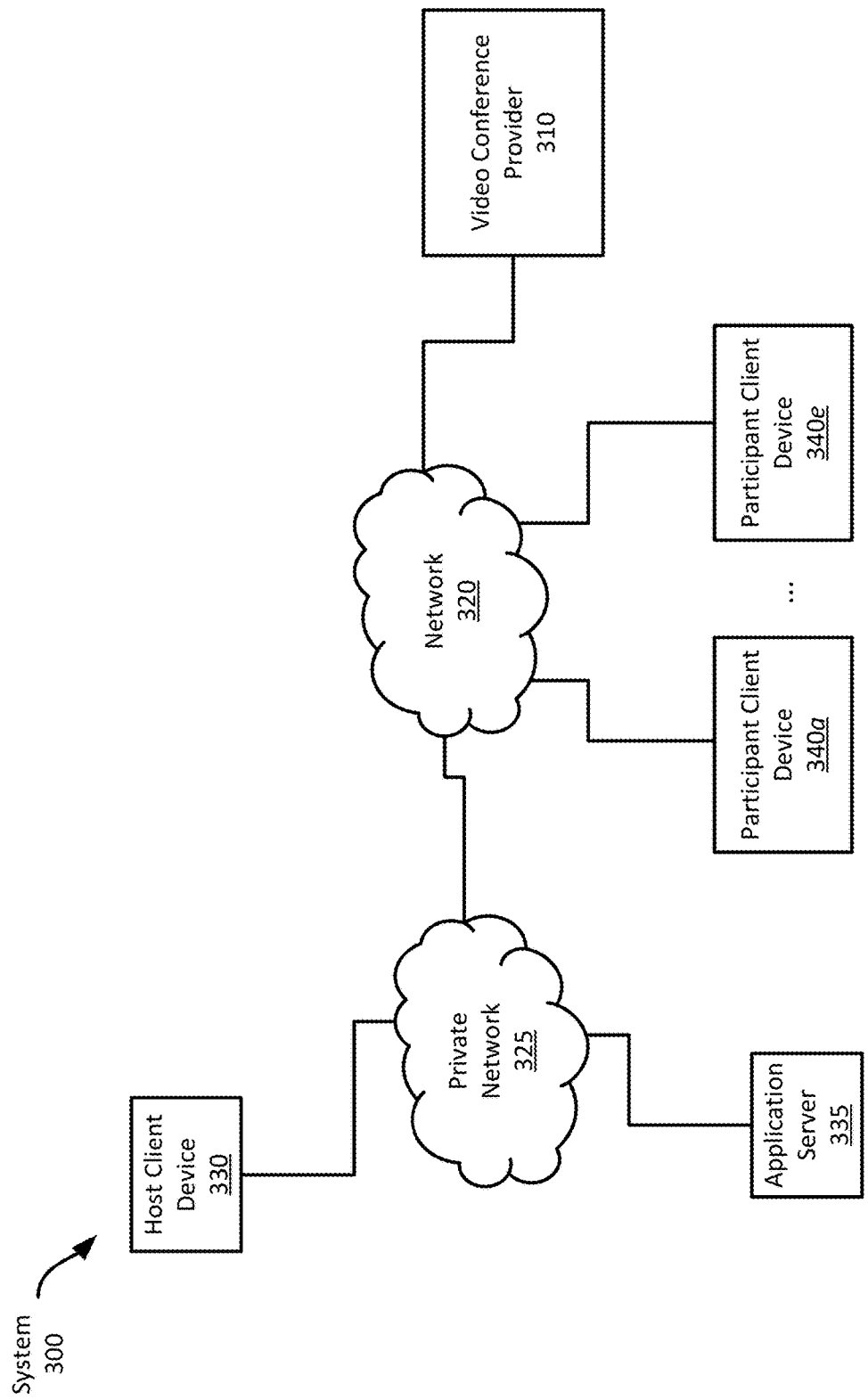

Referring now to FIG. 3, FIG. 3 shows an example system 300 for providing video bubbles during document editing. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the webinar or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the virtual meeting, the participant associated with the client device 340a may wish to share a collaborative document with the other meeting participants. To share the document, the participant may submit a request to the video conference provider 310 to share the collaborative document. In some embodiments, the collaborative document may be locally or remotely hosted by the video conference provider 310, the network 320, or the private network 325. The collaborative document may be a collaborative document in that more than one participant has access and authorization to make edits to the collaborative document. The one or more participants of the collaborative document may be the same as any one of the participants associated with the client devices 340a-m.

Upon receipt of the request to share the collaborative document, the video conference provider 310 may provide access to the collaborative document to each of the client device 340a-m and the host 330. In some embodiments, the video conference provider 310 may transmit the collaborative document to the client devices 340a-m and the host client deivce 330. That is, the collaborative document may be shared with the other meeting participants such that all participants can view the collaborative document. As will be described in greater detail below, upon sharing the collaborative document, a display for the virtual meeting may reorganize such that the collaborative document is the main focus of the meeting display.

Once the collaborative document is shared, a video bubble for each of the video streams corresponding to the client devices 340a-m and host client device 330 may be generated. In some embodiments, the video bubbles may be generated by the video conference provider 310, while in other embodiments, the video bubbles may be generated locally by each of the client devices 340a-m and host client device 330. As will be described in greater detail below with respect to FIGS. 5-7, the video bubbles may be overlaid on the collaborative document. The placement of a given video bubble may be responsive to input from a corresponding client device. For example, a video bubble for the client device 340a may move responsive to movement of a cursor within the document for the client device 340a. In this manner, the video bubbles may move responsive to a participant's engagement with the collaborative document.

In some embodiments, an audio stream may also be associated with the video bubble. For example, the audio stream from the client device 340a may be associated with the video bubble corresponding to the client device 340a. This can allow for an audio stream to be associated with the video bubble as edits are made to the collaborative document, providing additional context to the edits made to the document. As can be appreciated, this can allow meeting participants to discuss the contents of the collaborative document in real time.

Figure 4:
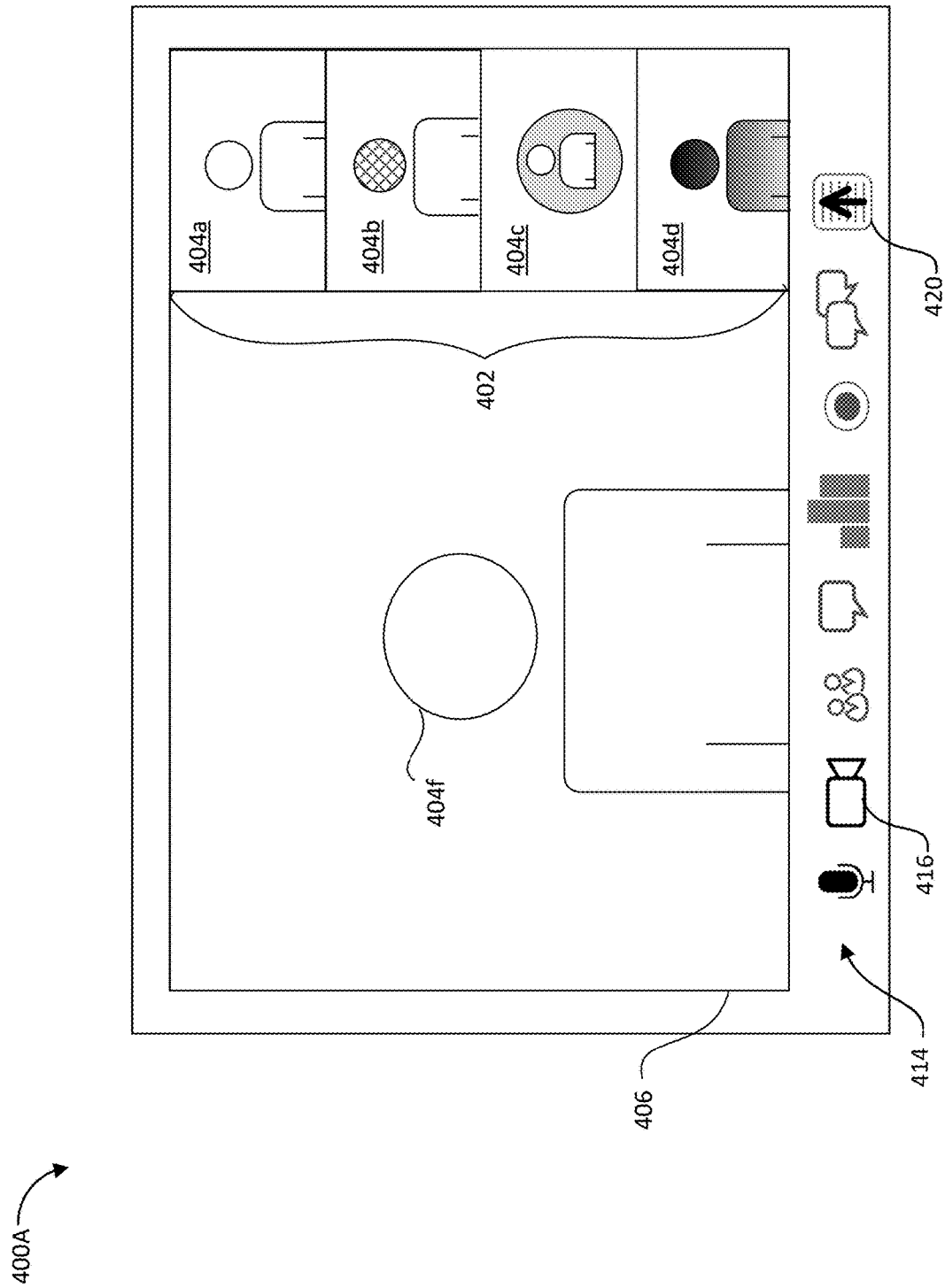
FIG. 4 illustrates a graphical participant interface for providing sharing a collaborative document during a virtual meeting, according to an embodiment herein.

Referring now to FIG. 4, FIG. 4 illustrates a GUI 400 for sharing a collaborative document during a virtual meeting, according to an embodiment. The GUI 400 may be presented to a participant or a host during a virtual meeting, such as the virtual meeting 350. The following figures and related components, such as GUI 400 of FIG. 4, will be described with respect to systems shown in FIG. 3, however, any suitable system according to this disclosure may be employed, such as those described in FIGS. 1 and 2.

In some embodiments, a GUI 400 is viewable to a participant of the video conference on the participant's device, for example the GUI 400 may be viewable to participant A on the client device 340a. Presentation of the GUI 400 on the participant's device may be in response to the initiation of the video conference.

The GUI 400 may include a roster 402 of the participants 404a-e in the video conference. The roster 402 may include a video stream of some or all of the participants 404a-e. In other embodiments, the roster 402 may include a picture, image, representation, avatar or a listing of some or all of the participants 404a-e who have joined the virtual meeting. When a participant joins the video conference, the joining participant is added to the roster 402.

Once the virtual meeting is initiated, video and audio streams may be exchanged between the participants 404a-e. Display 406 may display the video stream of a currently speaking participant 404e. The audio stream from participant 404e may also be transmitted along with the display 406. In some embodiments, more than one participant may be speaking, and in such cases, display 406 may include two or more windows providing the video streams from the speaking participants.

At some time after the virtual meeting is initiated, one or more of the participants 404a-e may wish to share a document with the other participants in the virtual meeting. To share a document with the virtual meeting, a participant, such as the participant 404a may select a share document option. For example, to share the document, participant 404a may select a share document selection 420 on a dashboard 414. The dashboard 414 may contain one or more action selections. For example, dashboard 414 may include the share document selection 420 and a recording selection 416 that allows a participant to record the streams of audio and video during the virtual meeting. Upon selection of the share document selection 420, the participant 404a may be prompted to input or select a document to share. The participant 404a may select the document to share and the document may be shared with the other participants 404b-e of the virtual meeting. In some embodiments, the participant 404a may be allow the other participants 404b-e to edit or make changes to the document during the sharing. A document shared during a virtual meeting may be referred to herein as a collaborative document. As will be discussed in greater detail below with respect to FIGS. 6 and 7, upon sharing of the document, a video bubble may be generated for each of the participants 404*a-e* based on the video stream associated with each of the participants 404*a-e*.

Figure 5:
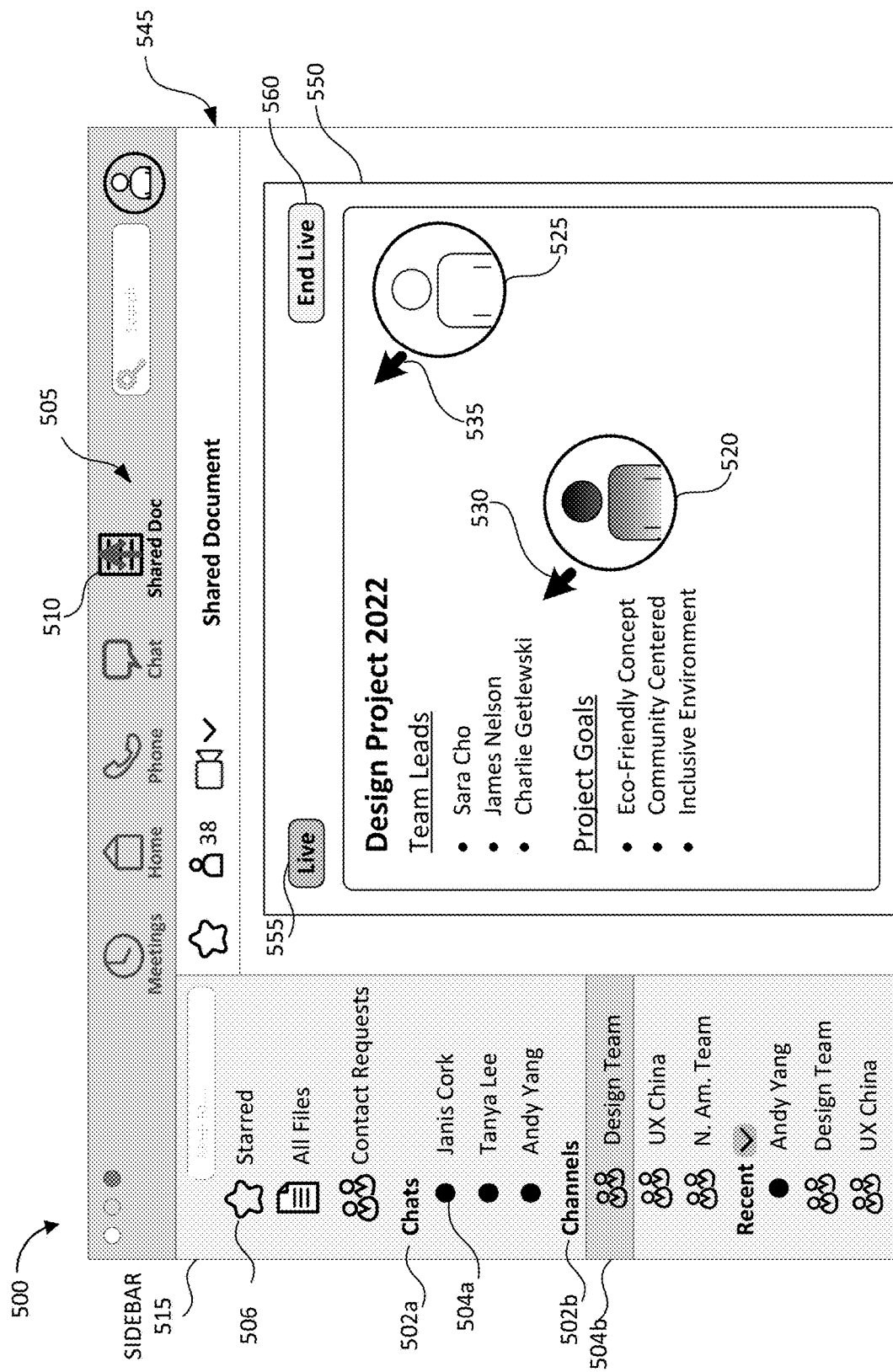
FIG. 5 illustrates a master collaborative document panel for providing a collaborative document outside of a virtual meeting environment, according to an embodiment herein.

As noted above, in some embodiments, a participant may access a collaborative document outside of a virtual meeting environment. For example, the participant may access a collaborative document through a master collaborative document panel hosted by a video conference provider, such as the video conference provider 310, or by a third party. Referring now to FIG. 5, an example master collaborative document panel for providing a collaborative document outside of a virtual meeting environment is provided. The master collaborative document panel 500 may be displayed on a client device in response to information sent by a chat and video conference provider, such as the chat and video conference provider 110 in FIG. 1. The master collaborative document panel 500 may be generated by an application run by one or more processors stored on the client device. The client device may be a personal computer such as a desktop or laptop, a mobile device, or other computing device having at least a processor, non-transitory memory, a participant input system, and communication interface, providing network connectivity.

The master collaborative document panel 500 may include a general dashboard 505, a chat control dashboard 545, a sidebar 515, and a collaborative document window 550. The general dashboard 505 may include one or more buttons or links that switch functionalities and/or views of the master collaborative document panel 500. For example, FIG. 5 shows a collaborative document view, perhaps in response to a participant command selecting a collaborative document button 510 in the general dashboard 505. In this view, the collaborative document window 550 and other components illustrated in FIG. 5 may be displayed on the client device. In other examples, a participant may select a contacts button. In response to the contacts button being selected, the collaborative document window 550 may be replaced by a display of a contacts window including a list of participant contacts associated with the participant of the client device. The sidebar 515 may be displayed alongside the contacts window. Other configurations are also possible. Various buttons on the control dashboard 545 may correspond to various displays of windows being displayed on the client device. Any number of components shown in FIG. 5 may be displayed on the client device with any of the various windows. Similarly, any of the components may cease to be displayed in accordance with any of the windows.

The sidebar 515 may include one or more chat channel headings. A chat channel heading 502*a* may include one or more chat channels such as the chat channel 504*a*. In some examples, the chat channel 504*a* may include a private chat, where the chat is between the participant associated with the client device and another participant. Messages sent and received via the chat channel 504*a* may only be accessed by the participants in the chat channel 504*a*. Thus, the client devices associated with the participant and the client device associated with the other participant may securely communicate with each other.

A chat channel heading 502*b* may include a chat channel 504*b*. The chat channel 504*b* may by a group chat, where two or more participants have access to send and receive messages within the chat channel. In some examples, the chat channel 504*b* may only be accessed by participants who have permission to enter the chat channel. A host of the chat channel 504*b* and/or the video chat and video conference provider may grant access to the chat channel 504*b*. Although only the chat channel headings 502*a-b* are shown, other chat channel headings are possible. For example, some examples may include a chat channel heading that displays, on the client device, only those channels that the participant associated with the client device is a member of that have been recently accessed. "Recently accessed" may be determined by the client device to be a fixed number of most recent channels accessed by the participant, or may be only those channels access within a certain time, calculated from the current time.

In some embodiments, a collaborative document may be associated with a chat channel. For example, the chat channel 504*b* may have an associated collaborative document. The collaborative document associated with the chat channel 504*b* may be accessible and editable by only the participants of the chat channel 504*b*. When a collaborative document is associated with the chat channel 504*b*, the collaborative document may be accessed, and thereby edited, through the chat channel 504*b*. for example, a participant of the chat channel 504*b* may enter the chat channel 504*b* and be able to access the collaborative document within the chat channel 504*b*.

In some embodiments, the sidebar 515 may also include one or more combinatory headings, such as starred combinatory heading 506. A combinatory heading may aggregate one or more messages from one or more chat channels, according to one or more predetermined criteria. The combinatory headings may include a link that, in response to a participant command, cause the client device to display messages in the collaborative document window 550. The messages may be gathered from one or more chat channels, such as the chat channel 504*a-b*, and displayed based on a predetermined criteria. In FIG. 5, for example, the starred combinatory heading 506 may gather only those messages that have been marked by a participant of the client device. The marked messages may be stored at the client device, and/or may be stored at the chat and video conference provider. The link may cause the one or more processors included on the client device to determine which messages are marked messages and cause them to be displayed in the collaborative document window 550. In some examples, the link may cause the client device to send a signal to the chat and video conference provider. The chat and video conference provider may then determine which messages are marked messages and send information to the client device to generate a display of the marked messages in the collaborative document window 550.

Other combinatory headings (and associated links and functionality) are also considered. Other examples may include a recently edit document heading, an all files heading, a contact request heading, and others. As with the starred combinatory heading 506, an associated link may cause the client device and/or the chat and video conference provider to determine which messages (if any) meet predetermined criteria associated with the combinatory heading and subsequently display those messages on the client device.

The control dashboard 545 may display one or more control buttons and/or information regarding the collaborative document currently being displayed on the client device. The control buttons may include links that mark a collaborative document (e.g. to mark it such that it is determined to be a marked message via the starred combinatory heading 506), begin a video conference or start a video bubble, invite other contacts to join the collaborative document, or other tasks. The control dashboard 545 may also include a title of the collaborative document currently being displayed on the client device and/or a number of participants with access to the chat channel. One of ordinary skill in the art would recognize many different possibilities and configurations.

Upon selection of the collaborative document selection 510, a collaborative document 550 may be displayed. The collaborative document 550 may be a collaborative document that is shared with two or more participants. The two or more participants may have authorization to access, review, edit, and/or comment on the collaborative document 550. The collaborative document 550 may be stored on a local network or on a server hosted by the video conference provider or third party. By being stored remotely, the collaborative document 550 may be accessed by more than one participant and any edits made by a participant may be saved to the collaborative document 550.

When a participant accesses the collaborative document 550, a presence indicator of the participant within the document may be provided. For example, as illustrated, video bubbles 520 and 525 for a first participant and a second participant within the collaborative document 550 may be overlayed on the collaborative document 550. The video bubbles 520 and 525 may indicate the presence of the first and second participants, respectively, within the collaborative document 550. That is, when either of the first participant or the second participant access the collaborative document 550, the video bubbles 520 or 525 may be overlaid on the collaborative document 550 to indicate that the first participant or the second participant are viewing and/or editing the collaborative document 550.

The video bubbles 520 and 525 may indicate the presence of the first and second participants in a variety of formats. For example, the video bubbles 520 and 525 may include a logo, picture, avatar, or other indication of the first participant and the second participant. In an example embodiment, the video bubbles 520 and 525 may include a video stream of the first participant and the second participant. For example, the video bubble 520 may provide a first video stream from a first client device associated with the first participant and the video bubble 525 may provide a second video stream from a second client device associated with the second participant. In some embodiments, the video bubbles 520 or 525 may only include a video stream if the first participant or the second participant selects to review and/or edit the collaborative document 550 via a live mode button 555. If the first participant or the second participant wants to review/edit the collaborative document 550 without the video bubbles 520 and 525 or without a video stream for the video bubbles 520 and 525, the respective participant may select the end live mode button 560.

It should be appreciated that the video bubbles 520 and 525 may provide a different presence indicator format. For example, the video bubble 520 may be of the first video stream while the video bubble 525 may be a logo associated with the second participant. The format of the video bubbles 520 and 525 may be determined based on a format selected by the first participant and second participant, respectively. Additionally, while the following example is discussed with respect to the video bubbles 520 and 525, it should be appreciated that any number of video bubbles 520 and 525 may be provided. The number of video bubbles 520 and 525 may correspond to the number of participants accessing the collaborative document 550 at a given time.

As noted above, the video bubbles 520 and 525 may indicate the presence of the first participant and the second participant, respectively, within the collaborative document 550. For example, the placement of the video bubble 520 may correspond to the placement of a cursor 530 of the first participant. Similarly, the placement of the video bubble 525 may correspond to the placement of a cursor 535 of the second participant. That is, when the first participant moves the cursor 530 around the collaborative document 550, the placement of the video bubble 520 may follow the movement of the cursor 530. The video bubble 525 may similarly move around the collaborative document 550 responsive to the cursor 535. In this manner, the video bubbles 520 and 525 can indicate the content that the first participant and the second participant are viewing/editing. This can provide context to other participants within the document as to what the first participant and/or second participant are viewing/editing.

As the first and second participant move around the collaborative document 550, the video bubbles 520 and 525 may follow the cursors 530 and 535, as discussed above. It should be appreciated that in some embodiments, another form of input from the first participant and the second participant may be used for placement of the video bubbles 520 and 525. For example, the placement of the video bubble 520 may correspond to input from a keyboard, camera, or touch screen from the first client device associated with the first participant.

The video bubbles 520 and 525 may be overlaid on the collaborative document 550. In some embodiments, the video bubbles 520 and 525 may be generated locally by a respective client device. For example, the video bubbles 520 and 525 may be generated by the first client device of the first participant when the first participant accesses the collaborative document 550. In other embodiments, the video bubbles 520 and 525 may be remotely generated. For example, the video conference provider 310 or a third party may generate the video bubbles 520 and 525 responsive to the first participant and the second participant accessing the collaborative document 550.

Figure 6:
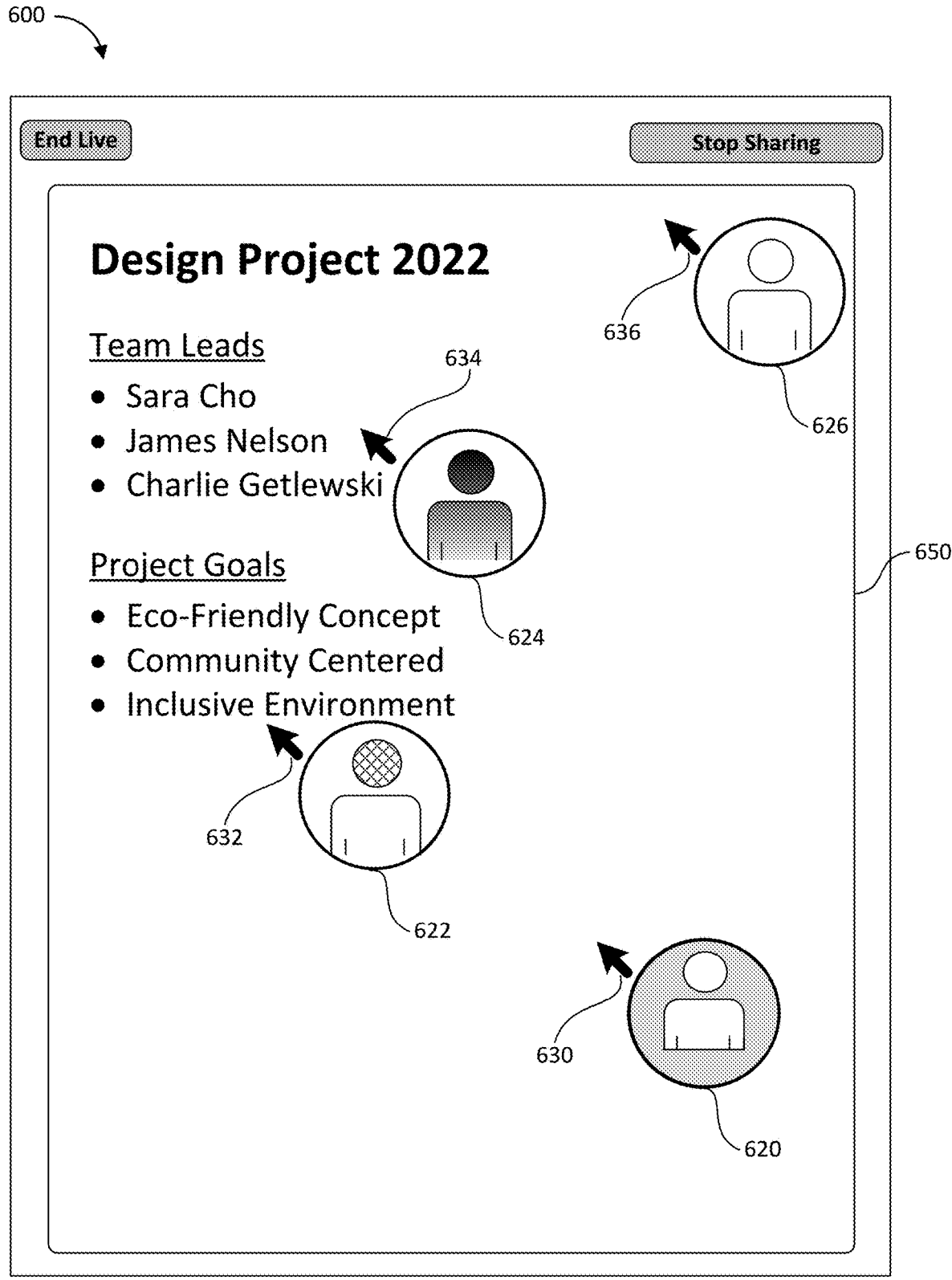
FIG. 6 illustrates example of a collaborative document with video bubbles, according to an embodiment herein.

Turning now to FIG. 6, an example embodiment 600 for a collaborative document 650 with video bubbles is provided, according to an embodiment. The collaborative document 650 may be the same or similar to the collaborative document 550. The collaborative document 650 may be accessed by one or more participants via a master collaborative document panel, such as the master collaborative document panel 500 discussed with respect to FIG. 5, or the collaborative document 650 may be accessed during a virtual meeting via sharing a document. For example, the collaborative document 650 may be accessed by one or more participants via selection of the share document selection 420, as discussed with respect to FIG. 4. For ease of explanation, the following discussion involves the collaborative document 650 being shared during a virtual meeting, however, it should be appreciated that the collaborative document 650 may be accessed by the participants via any other access means.

In the example embodiment 600, four participants may be accessing/viewing the collaborative document 650. For example, a first participant, a second participant, a third participant, and a fourth participant may be part of a virtual meeting in which the collaborative document 650 is being shared. Upon sharing of the collaborative document 650, the video streams corresponding to each of the four participants may be used to generate a video bubble. As illustrated, a first video bubble 620 associated with the first participant may be generated, a second video bubble 622 associated with the second participant may be generated, a third video bubble 624 associated with the third participant may be generated, and a fourth video bubble 626 associated with the fourth participant may be generated. Each of the video bubbles 620-626 may be generated in response to the sharing of the collaborative document 650 during the virtual meeting. For example, when the collaborative document 650 is shared, the video streams or other presence indicators for each of the participants from the roster 402 may be used to generated a respective video bubble 620-626. As noted above, the video bubbles 620-626 may include other formats as a presence indictor. For example, instead of a video stream one or more the video bubbles 620-626 may include a logo, picture, avatar, or the like as a presence indicator for a respective participant.

Each of the video bubbles 620-626 may be placed over the collaborative document 650 responsive to an input from a corresponding client device. For example, the video bubble 620 may be placed on the collaborative document 650 in a location corresponding to a cursor 630 associated with a first client of the first participant. As the first participant moves the cursor 630, via the first client device, around the collaborative document 650 the placement of the video bubble 620 may also move around the collaborative document 650. Similarly, the placement of the second video bubble 622, the third video bubble 624, and the fourth video bubble 626 may be responsive to movement of a second cursor 632, a third cursor 634, and a cursor 636, respectively.

By moving the placement of the video bubbles 620-626 responsive to input from the four participants, context for collaborative document 650 may be more readily provided to the participants of the virtual meeting. For example, if the third participant is presenting while the collaborative document 650 is shared, the placement of the third video bubble 624 may direct the attention of the first, second, and fourth participants to content near the third video bubble 624. For example, the attention of the first, second, and fourth participants may be directed to the names of the provided Team Leads. Moreover, if the video bubble 624 includes a video stream associated with the third participant, then the first, second, and fourth participants can see the third participant as he or she presents without missing or splitting attention with viewing the referenced content in the collaborative document 650. In some embodiments, the video bubbles 620-626 may be modified based on the involvement of a respective participant with the collaborative document 650.

Figure 7:
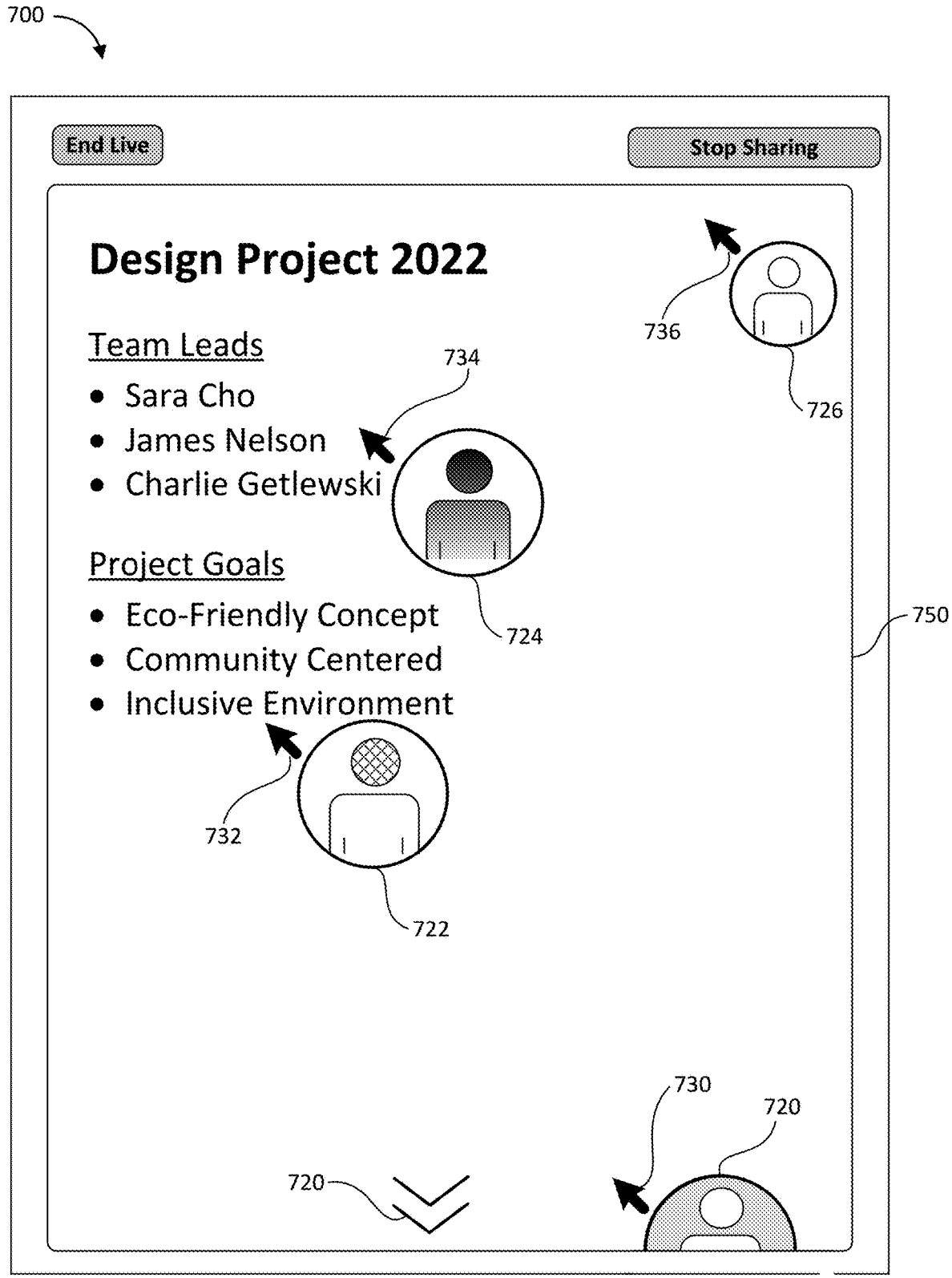
FIG. 7 illustrates another example of a collaborative document with video bubbles, according to an embodiment herein.

Turning now to FIG. 7, another example 700 of a collaborative document 750 with video bubbles is provided, according to an embodiment. The collaborative document 750 may be the same or similar to the collaborative document 650. As illustrated, four video bubbles 720-726 may be overlaid on the collaborative document 750. Each of the video bubbles 720-726 may be associated with a corresponding participant. Similar to the video bubbles 620-626 discussed above, the placement of the video bubbles 720-726 may be responsive to the movement of a respective cursor 730-736 based on input from a corresponding client device.

As noted above, in some embodiments, the video bubbles 720-726 may be modified based on a respective participant's level of involvement or interaction in the collaborative document 750. For example, if a third participant associated with the video bubble 724 is involved in the collaborative document 750 (i.e., presenting or editing the collaborative document 750), the video bubble 724 may be enlarged to indicate that the third participant is interacting with the collaborative document 750. In other embodiments, the video bubble 724 may pulse or change colors to indicate involvement of the third participant with the collaborative document 750.

In contrast, if a participant is not involved with the collaborative document 750, e.g., the participant is merely watching the virtual meeting and is not editing or speaking, then the video bubble may be modified to indicate the lack of involvement. For example, if a fourth participant associated with the video bubble 726 is not interacting with the collaborative document 750 and/or the virtual meeting, then the video bubble 726 may be diminished to indicate the lack of involvement of the fourth participant. In other embodiments, the video bubble 726 may change colors (e.g., be greyed out) or be placed off to the side of the collaborative document 750 to indicate a reduced level of involvement with the collaborative document.

In some embodiments, upon accessing the collaborative document 750, whether during a virtual meeting or outside of a virtual meeting setting, any review or edits to the collaborative document 750 may be recorded. For example, if the collaborative document 750 is accessed outside of the virtual meeting environment, by for example, the master collaborative document panel 500, a recording may be initiated once a participant accesses the collaborative document 750. Similarly, if the collaborative document 750 is shared during a virtual meeting, upon sharing of the collaborative document 750 a recording of the collaborative document 750 may be initiated. A recording of the collaborative document 750 may include a recording of the collaborative document 750 along with any video bubbles present on the collaborative document 750. For example, with the example on hand, a recording may capture the collaborative document 750 along with the video bubbles 720-726 overlaid on the collaborative document 750. The recording may capture the placement of the video bubbles 720-726 and any edits made to the collaborative document 750. In some embodiments, the recording may also include any audio streams that may be exchanged by the participants during their review and/or edits to the collaborative document 750.

The recording of the collaborative document 750 may include a recording of the video bubbles 722-726 that are on-display as well as any off-display video bubbles. For example, the video bubble 720 may move off-display to a viewing participant. The placement of the video bubble 720 may move off-display responsive to selection of the down scroll 710 by the cursor 730. A first participant associated with the video bubble 720 may want to review/edit content of the collaborative document 750 that is different than the content that a viewing participant may be viewing. Thus, while the viewing participant, for example, the third participant associated with the video bubble 724, may stay on a first portion of the collaborative document 750, the first participant may view a second portion of the collaborative document 750 that is considered "off-display" to the viewing participant.

Because the placement of the video bubble 720 is off-display to the viewing participant, the viewing participant may not know or be aware of any edits to the collaborative documents 750 made by the first participant. By recording the entirety of the collaborative document 750 and placement of the video bubbles 720-726 throughout the collaborative document 750, the viewing participant may be able to view the recording to gain context for any edits made by the first participant while off-display. Moreover, the recording of the collaborative document 750 may be saved and/or shared after the participants exit the collaborative document 750 to provide context for any edits made during the sharing session. For example, the recording of the collaborative document 750 may be saved to a chat channel or file of a project associated with the collaborative document 750 so that participants can view the recording at a later date. This can allow non-present participants to gain context for edits or provide context to any edits made to the collaborative document 750.

Figure 8:
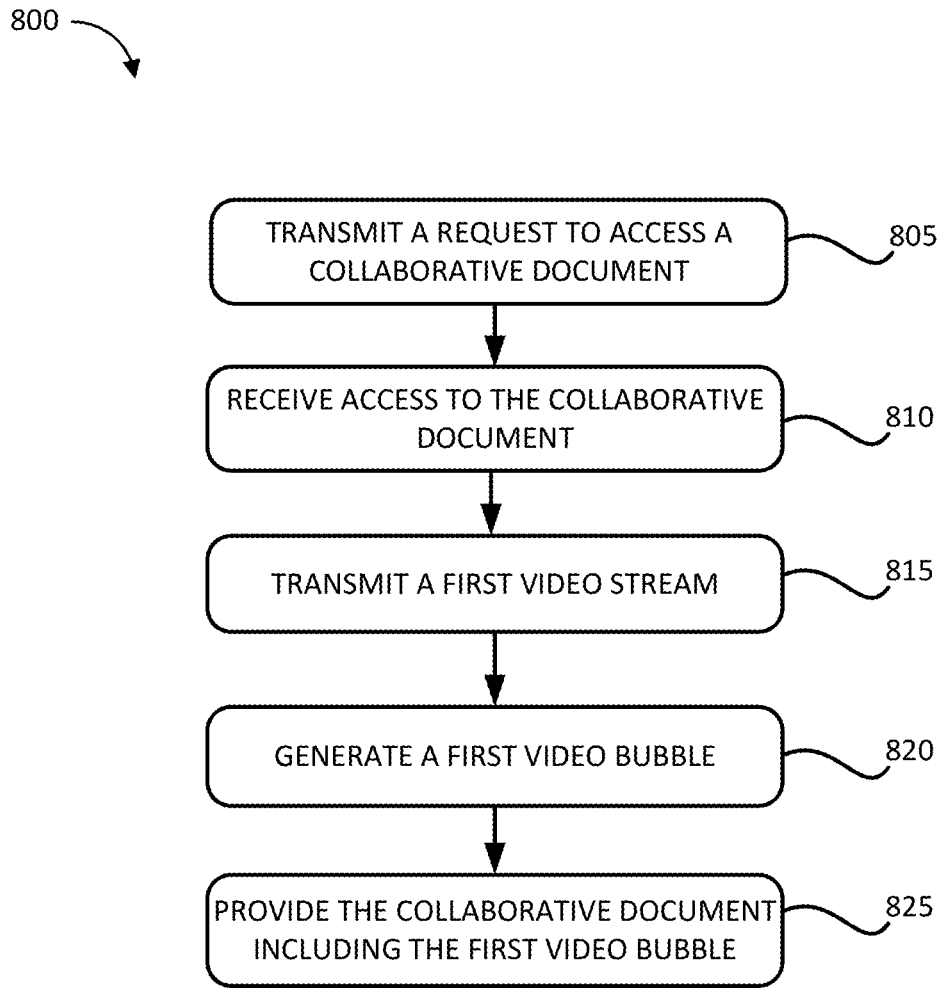
FIG. 8 depicts an exemplary method for providing video bubbles during document editing, according to an embodiment herein.

Referring now to FIG. 8, a flowchart of an example method 800 for providing video bubbles during document editing is provided. The description of the method 800 in FIG. 8 will be made with reference to FIGS. 3-7, however any suitable system according to this disclosure may be used, such as the example systems 100 and 200, shown in FIGS. 1 and 2.

Method 800 may include step 805. At step 805, the method 800 may include transmitting a request to access a collaborative document. For example, a first client device, such as client device 340a, may transmit a request to a video conference provider, such as the video conference provider 310. In some embodiments, the collaborative document may be the same or similar to the collaborative document 550, 650, or 750.

At step 810, the method 800 may include receiving, by the first client device, access to the collaborative document. For example, the video conference provider 310 may grant the client device 340a access to the collaborative document.

At step 815, the method 800 my include transmitting, from the first client device, a first video stream. For example, upon accessing the collaborative document, the client device 340a may transmit a first video stream to the video conference provider 310. In some embodiments, the collaborative document may be accessed during a virtual meeting. In such cases, the first video stream may be transmitted from the first client device prior to accessing the collaborative document.

At step 820, the method 800 may include generating a first video bubble associated with the first video stream within the collaborative document. The first video bubble may be generated such to overlay on the collaborative document. In some embodiments, the first video bubble may be generated locally by the first client device, where in other embodiments the first video bubble may be generated remotely from the first client device, for example by the video conference provider 310 or a third party. As discussed above, the first video bubble may include the first video stream in some embodiments, while in other embodiments, the first video bubble may include a picture, logo, or avatar associated with the first client device.

At step 825, the method 800 may include providing, to the second client device, the collaborative document comprising the first video bubble. For example, in some embodiments, the second client device may access the collaborative document at the same time as the first client device. During that access, the second client device may be provided the collaborative document with the first video bubble overlaid thereon. In other embodiments, the first client device and the second client device may be part of a virtual meeting. During the virtual meeting, the collaborative document may be shared during the virtual meeting. Upon sharing, and thereby accessing the collaborative document, the second client device may be provided the collaborative document with the first video bubble.

In some embodiments, the method 800 may include determining placement of the first video bubble within the collaborative document based on input from the first client device. For example, if the video bubble is generated locally, the first client device may determine the placement of the first video bubble. In another example, the video bubble may be generated remotely. In such cases, the video conference provider or third party may determine the placement of the first video bubble. Placement of the first video bubble may be determined by an interaction level of the first video bubble with the content of the collaborative document. For example, if a participant associated with the first video bubble actively interacts with the collaborative document (e.g., editing, talking, reviewing), then a high interaction level may be determined. As such, the first video bubble may be placed near the content that the participant is interacting with. In contrast, if it is determined that the participant is not interacting with the content of the collaborative document (e.g., there is no input from the first client device or audio associated with the first client device), then a low interaction level may be determined. In such cases, the first video bubble may be placed on the periphery of the collaborative document. In some embodiments, the size, shape, or characteristics of the first video bubble may be modified based on the determined interaction level.

In some embodiments, the method 800 may include generating, by the first client device, one or more edits to the collaborative document. The one or more edits may include input from the first client device. The method 800 may also include modifying the placement of the first video bubble based on the one or more edits to the collaborative document. For example, the one or more edits to the collaborative document may indicate a high interaction level and thus the placement of the first video bubble may be modified based on the one or more edits.

In some embodiments, the method 800 may include receiving, from a second client device, a second video stream and generating a second video bubble associated with the second video stream within the collaborative document. If the video bubbles are locally generated, then the first client device may generate the second video bubble. If the video bubbles are remotely generated, then the video conference provide or third party may generate the second video bubble. The method 800 may also include determining the placement of the second video bubble within the collaborative document. For example, in some embodiments, the first client device may determine the placement of the second video bubble, while in other embodiments, the video conference provider or a third party may determine the placement of the second video bubble. The method 800 may also include modifying the placement of the second video bubble within the collaborative document based on input from the second client device. For example, the placement of the second video bubble may be determined by an interaction level of the second client device with the collaborative document.

In some embodiments, the method 800 may include saving, by the first client device, the collaborative document as a saved collaborative document. The saved collaborative document may include the one or more edits to the collaborative document and movement of the placement of the first video bubble. In other embodiments, the method 800 may include establishing, by a video conference provider, a virtual meeting. The virtual meeting may include a plurality of participants. The plurality of participants may include the first client device and the second client device. In such cases, the step of transmitting, from the first client device, the request to access the collaborative document may include sharing the collaborative document with the plurality of participants during the virtual meeting. In such embodiments, the method 800 may include during sharing of the collaborative documents with the plurality of participants during the virtual meeting, generating a video bubble for each of the plurality of participants in the collaborative document.

Figure 9:
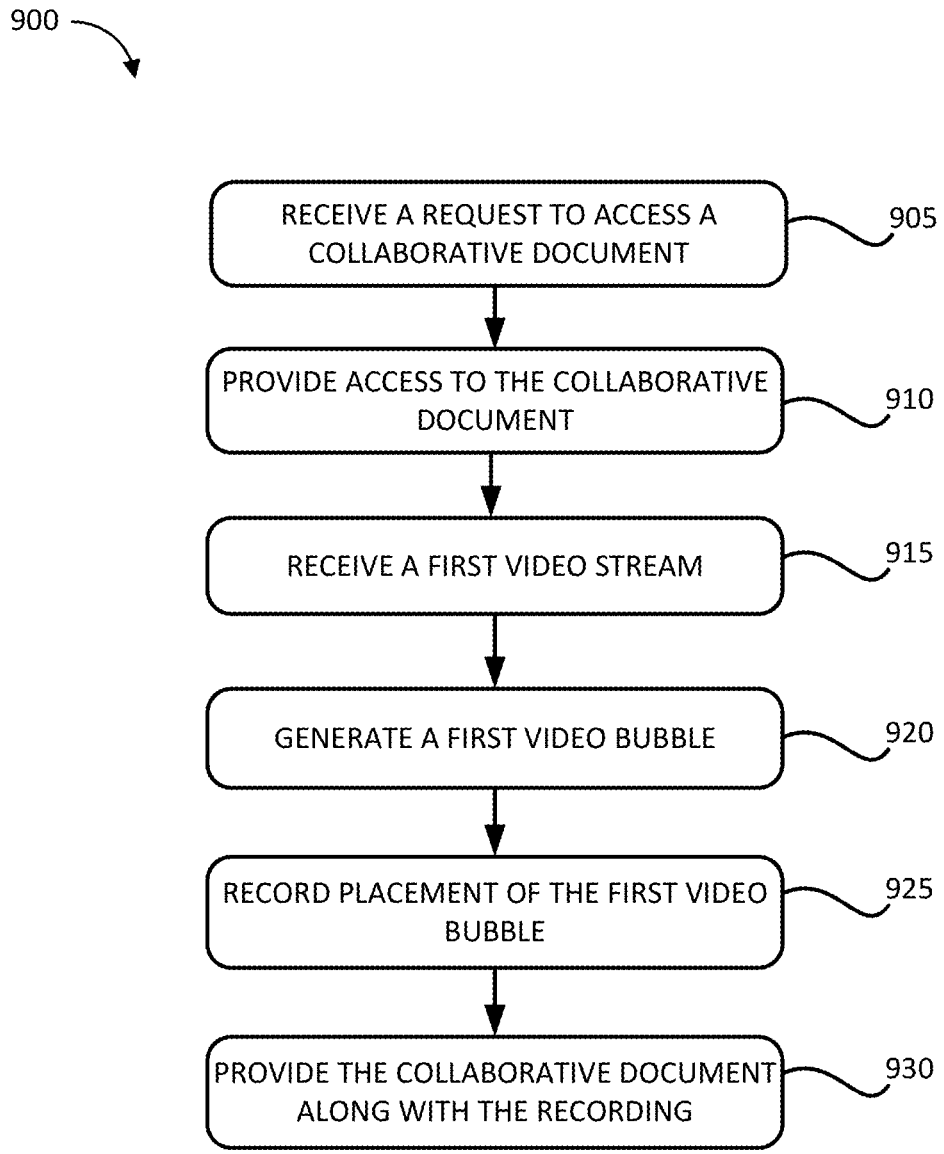
FIG. 9 depicts another exemplary method for providing video bubbles during document editing, according to an embodiment herein.

Referring now to FIG. 9, another flowchart of an example method 900 for providing video bubbles during document editing is provided. The description of the method 900 in FIG. 8 will be made with reference to FIGS. 3-7, however any suitable system according to this disclosure may be used, such as the example systems 100 and 200, shown in FIGS. 1 and 2.

Method 900 may include step 905. At step 905, the method 900 may include receiving a request to access a collaborative document. For example, a first client device, such as client device 340a, may transmit a request to a video conference provider, such as the video conference provider 310. In some embodiments, the collaborative document may be the same or similar to the collaborative document 550, 650, or 750.

At step 910, the method 900 may include providing, to the first client device, access to the collaborative document. For example, the video conference provider 310 may grant the client device 340a access to the collaborative document.

At step 915, the method 900 may include receiving, from the first client device, a first video stream. For example, upon accessing the collaborative document, the client device 340a may transmit a first video stream to the video conference provider 310. In some embodiments, the collaborative document may be accessed during a virtual meeting. In such cases, the first video stream may be transmitted from the first client device prior to accessing the collaborative document.

At step 920, the method 900 may include generating a first video bubble associated with the first video stream within the collaborative document. The first video bubble may be generated such to overlay on the collaborative document. In some embodiments, the first video bubble may be generated locally by the first client device, where in other embodiments the first video bubble may be generated remotely from the first client device, for example by the video conference provider 310 or a third party. As discussed above, the first video bubble may include the first video stream in some embodiments, while in other embodiments, the first video bubble may include a picture, logo, or avatar associated with the first client device.

At step 925, the method 900 may include recording, by a video conference provider, placement of the first video bubble overlaid on the collaborative document based on input from the first client device. As discussed above, the placement of the first video bubble may be determined based on an interaction level of the first client device with the content of the collaborative document.

At step 930, the method 900 may include providing, to a second client device, the collaborative document along with a recording the placement of the first video bubble overlaid on the collaborative document. In some embodiments, the method 900 may include receiving, from the first client device, a first audio stream, associating the first audio stream with the first video bubble, and recording in the recording, the first audio stream along with the placement of the first video bubble.

In some embodiments, the method 900 may also include receiving, from the first client device, one or more edits to the collaborative document. The one or more edits may include input from the first client device. The method 900 may further include modifying the placement of the first video bubble based on the one or more edits to the collaborative document.

In some embodiments, the method 900 may further include receiving, from the second client device, a second video stream and generating, by the video conference provider, a second video bubble associated with the second video stream overlaid on the collaborative document. The video conference provider may determine placement of the second video bubble overlaid on the collaborative document based on input from the second client device. The method 900 may further include recording in the recording, by the video conference provider, the placement of the second video bubble overlaid on the collocative document.

In some embodiments, the method 900 may also include saving, by the video conference provider, the collaborative document as a saved collaborative document. The saved collaborative document may include one or more edits to the collaborative document and the recording of the placement of the first video bubble overlaid on the collaborative document. In other embodiments, the method 900 may further include establishing, by the video conference provider, a virtual meeting. The virtual meeting may include a plurality of participants. The plurality of participants may include the first client device and the second client device. In such cases, the step for receiving, from the first client device, the request to access the collaborative document may further include sharing the collaborative document with the plurality of participants during the virtual meeting.

In some embodiments, the method 900 may further include during sharing of the collaborative document with the plurality of participants during the virtual meeting, generating, by the video conference provider, a video bubble for each of the plurality of participants in the collaborative document. The method 900 may also include modifying placement of the video bubble for each of the plurality of participants in the collaborative document based on input from each of the plurality of participants and recording in the recording, by the video conference provider, the placement of the video bubble for each of the plurality of participants overlaid on the collaborative document.

Figure 10:
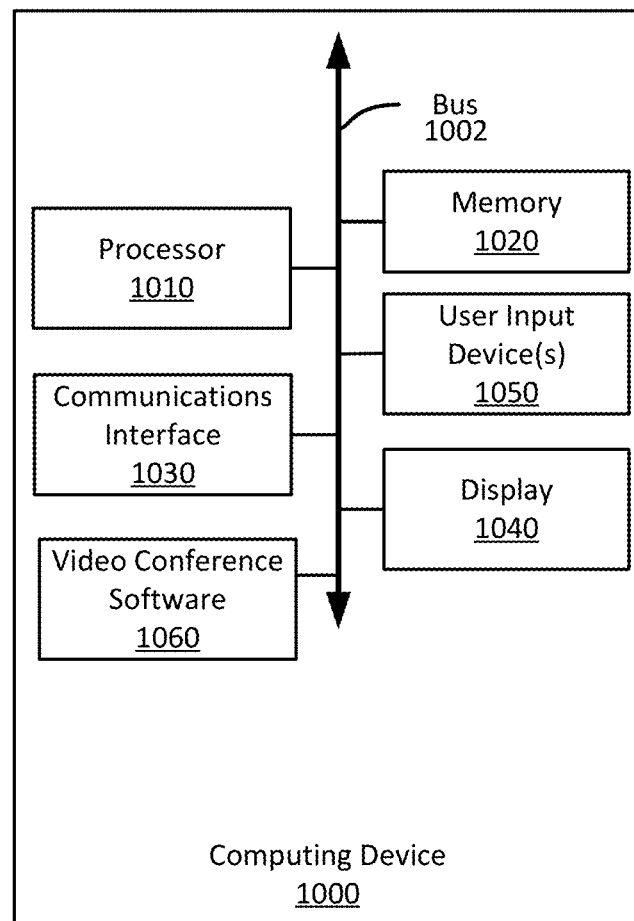
FIG. 10 shows an example computing device suitable for providing video bubbles during document editing, according to this disclosure.

Referring now to FIG. 10, FIG. 10 shows an example computing device 1000 suitable for use in example systems or methods for providing video bubbles during document editing. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing video bubbles during document editing, such as part or all of the example method 800, described above with respect to FIG. 8, and/or the example method 900, described above with respect to FIG. 9. The computing device, in this example, also includes one or more participant input devices 1050, such as a keyboard, mouse, touchscreen, video input device (e.g., one or more cameras), microphone, etc., to accept participant input. The computing device 1000 also includes a display 1040 to provide visual output to a participant.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), Participant Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: transmit, from a first client device, a request to access a collaborative document; receive, by the first client device, access to the collaborative document; transmit, from the first client device, a first video stream; generate a first video bubble associated with the first video stream within the collaborative document; and provide, to a second client device, the collaborative document and the first video bubble.

Example 2 is the system of any previous or subsequent Example, wherein the processor is configured to execute further processor-executable instructions stored in the non-transitory computer-readable medium to: receive, from the second client device, a second video stream; and generate a second video bubble associated with the second video stream within the collaborative document.

Example 3 is the system of any previous or subsequent Example, wherein the processor is configured to execute further processor-executable instructions stored in the non-transitory computer-readable medium to: determine, based on input from the first client device, placement of the first video bubble within the collaborative document; determine, based on input from the second client device, placement of the second video bubble within the collaborative document; modify, based on input from the first client device, the placement of the first video bubble within the collaborative document; and modify, based on input from the second client device, the placement of the second video bubble within the collaborative document.

Example 4 is the system of any previous or subsequent Example, wherein the processor is configured to execute further processor-executable instructions stored in the non-transitory computer-readable medium to: generate, by the first client device, one or more edits to the collaborative document; track the one or more edits to the collaborative document with the first video bubble; and update the collaborative document based on the one or more edits.

Example 5 is the system of any previous or subsequent Example, wherein the processor is configured to execute further processor-executable instructions stored in the non-transitory computer-readable medium to: transmit, from the first client device, a first audio stream; and associate the first audio stream with the video bubble within the collaborative document.

Example 6 is the system of any previous or subsequent Example, wherein: the processor is configured to execute further processor-executable instructions stored in the non-transitory computer-readable medium to: join a virtual meeting having a plurality of participants, wherein the plurality of participants comprises the first client device and the second client device; and receive, from at least a portion of the plurality of participants, a video stream; and the instructions to transmit, from the first client device, the request to access the collaborative document cause the processor to execute further processor-executable instructions stored in the non-transitory computer-readable medium to: transmit, from the first client device a request to share the collaborative document with the plurality of participants during the virtual meeting; and share the collaborative document with the plurality of participants during the virtual meeting.

Example 7 is the system of any previous or subsequent Example, wherein the processor is configured to execute further processor-executable instructions stored in the non-transitory computer-readable medium to: generate, within the collaborative document, a video bubble associated with each video stream received from the portion of the plurality of participants.

Example 8 is a method comprising: transmitting, from a first client device, a request to access a collaborative document; receiving, by the first client device, access to the collaborative document; transmitting, from the first client device, a first video stream; generating a first video bubble associated with the first video stream within the collaborative document; and providing, to a second client device, the collaborative document comprising the first video bubble.

Example 9 is the method of any previous or subsequent Example, wherein the method further comprises: determining, by the first client device, placement of the first video bubble within the collaborative document based on input from the first client device; and modifying, by the first client device, the placement of the first video bubble within the collaborative document based on input from the first client device.

Example 10 is the method of any previous or subsequent Example, wherein the method further comprises: generating, by the first client device, one or more edits to the collaborative document, wherein the one or more edits comprise input from the first client device; and modifying the placement of the first video bubble based on the one or more edits to the collaborative document.

Example 11 is the method of any previous or subsequent Example, wherein the method further comprises: receiving, from the second client device, a second video stream; generating, by the first client device, a second video bubble associated with the second video stream within the collaborative document; determining, by the first client device, placement of the second video bubble within the collaborative document; and modifying the placement of the second video bubble within the collaborative document based on input from the second client device.

Example 12 is the method of any previous or subsequent Example, wherein the method further comprises: saving, by the first client device, the collaborative document as a saved collaborative document, wherein the saved collaborative document comprises the one or more edits to the collaborative document and movement of the placement of the first video bubble.

Example 13 is the method of any previous or subsequent Example, the method further comprising: establishing, by a video conference provider, a virtual meeting comprising a plurality of participants, wherein the plurality of participants comprise the first client device and the second client device; and wherein transmitting, from the first client device, the request to access the collaborative document further comprises sharing the collaborative document with the plurality of participants during the virtual meeting.

Example 14 is the method of any previous or subsequent Example, wherein the method further comprises: during sharing of the collaborative documents with the plurality of participants during the virtual meeting, generating a video bubble for each of the plurality of participants in the collaborative document.

Example 15 is a non-transitory computer-readable medium comprising processor-executable instructions configured to cause one or more processors to: transmit, from a first client device, a request to access a collaborative document; receive, by the first client device, access to the collaborative document; transmit, from the first client device, a first video stream; generate a first video bubble associated with the first video stream within the collaborative document; and provide, to a second client device, the collaborative document comprising the first video bubble.

Example 16 is the non-transitory computer-readable medium of any previous or subsequent Example, wherein instructions to provide, to the second client device, the collaborative document comprising the first video bubble causes the processor to execute further processor-executable instructions stored in the non-transitory computer-readable medium to: responsive to the second client device accessing the collaborative document, generate a second video bubble corresponding to the second client device.

Example 17 is the non-transitory computer-readable medium of any previous or subsequent Example, wherein the second video bubble comprises a picture or logo corresponding to the second client device.

Example 18 is the non-transitory computer-readable medium of any previous or subsequent Example, wherein the processor is configured to execute further processor-executable instructions stored in the non-transitory computer-readable medium to: determine an interaction level for each of the first video bubble and the second video bubble; and determine, based on the interaction level, placement for the first video bubble and the second video bubble within the collaborative document.

Example 19 is the non-transitory computer-readable medium of any previous or subsequent Example, wherein the interaction level for the second video bubble is determined to be low and the processor is configured to execute further processor-executable instructions stored in the non-transitory computer-readable medium to: modify the placement of the second video bubble to a margin of the collaborative document.

Example 20 is the non-transitory computer-readable medium of any previous or subsequent Example, wherein the processor is configured to execute further processor-executable instructions stored in the non-transitory computer-readable medium to: determine an interaction level for each of the first video bubble and the second video bubble; and modify, based on the interaction level, a size of the first video bubble and a size of the second video bubble within the collaborative document.

Example 21 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, from a first client device, a request to access a collaborative document; transmit, to the first client device, access to the collaborative document; receive, from the first client device, a first video stream; generate a first video bubble associated with the first video stream overlaid on the shared; record placement of the first video bubble overlaid on the collaborative document based on input from the first client device; and provide, to a second client device, the collaborative document along with a recording of the placement of the first video bubble overlaid on the collaborative document.

Example 22 is the system of any previous or subsequent Example, wherein the processor is configured to execute further processor-executable instructions stored in the non-transitory computer-readable medium to: receive, from the second client device, a second video stream; generate a second video bubble associated with the second video stream overlaid on the collaborative document; and record placement of the second video bubble overlaid on the collaborative document based on input from the second client device.

Example 23 is the system of any previous or subsequent Example, wherein the processor is configured to execute further processor-executable instructions stored in the non-transitory computer-readable medium to: modify, based on input from the first client device, the placement of the first video bubble overlaid on the collaborative document; and modify, based on input from the second client device, the placement of the second video bubble overlaid on the collaborative document.

Example 24 is the system of any previous or subsequent Example, wherein the processor is configured to execute further processor-executable instructions stored in the non-transitory computer-readable medium to: receive, from the first client device, one or more edits to the collaborative document; track the one or more edits to the collaborative document with the first video bubble; and update the collaborative document based on the one or more edits.

Example 25 is the system of any previous or subsequent Example, wherein the processor is configured to execute further processor-executable instructions stored in the non-transitory computer-readable medium to: receive, from the first client device, a first audio stream; associate the first audio stream with the video bubble overlaid on the collaborative document; and record the first audio stream in the recording along with the placement of the first video bubble with the collaborative document.

Example 26 is the system of any previous or subsequent Example, wherein: the processor is configured to execute further processor-executable instructions stored in the non-transitory computer-readable medium to: establish a virtual meeting having a plurality of participants, wherein the plurality of participants comprises the first client device; and receive, from at least a portion of the plurality of participants, a video stream; and the instructions to receive, from the first client device, the request to access the collaborative document cause the processor to execute further processor-executable instructions stored in the non-transitory computer-readable medium to: receive, from the first client device, a request to share the collaborative document with the plurality of participants during the virtual meeting; and share the collaborative document with the plurality of participants during the virtual meeting.

Example 27 is the system of any previous or subsequent Example, wherein the processor is configured to execute further processor-executable instructions stored in the non-transitory computer-readable medium to: generate, overlaid on the collaborative document, a video bubble associated with each video stream received from the portion of the plurality of participants; and record in the recording placement the video bubble associated with each video stream received from the portion of the plurality of participants overlaid on the collaborative document.

Example 28 is a method comprising: receiving, from a first client device, a request to access a collaborative document; providing, to the first client device, access to the collaborative document; receiving, from the first client device, a first video stream; generating a first video bubble associated with the first video stream overlaid on the collaborative document; recording, by a video conference provider, placement of the first video bubble overlaid on the collaborative document based on input from the first client device; and providing, to a second client device, the collaborative document along with a recording of the placement of the first video bubble overlaid on the collaborative document.

Example 29 is the method of any previous or subsequent Example, wherein the method further comprises: receiving, from the first client device, a first audio stream; associating the first audio stream with the first video bubble; and recording in the recording, the first audio stream along with the placement of the first video bubble.

Example 30 is the method of any previous or subsequent Example, wherein the method further comprises: receiving, from the first client device, one or more edits to the collaborative document, wherein the one or more edits comprise input from the first client device; and modifying the placement of the first video bubble based on the one or more edits to the collaborative document.

Example 31 is the method of any previous or subsequent Example, wherein the method further comprises: receiving, from the second client device, a second video stream; generating, by the video conference provider, a second video bubble associated with the second video stream overlaid on the collaborative document; determining, by the video conference provider, placement of the second video bubble overlaid on the collaborative document based on input from the second client device; modifying, by the video conference provider, the placement of the second video bubble overlaid on the collaborative document based input from the second client device; and recording in the recording, by the video conference provider, the placement of the second video bubble overlaid on the collaborative document.

Example 32 is the method of any previous or subsequent Example, wherein the method further comprises: saving, by the video conference provider, the collaborative document as a saved collaborative document, wherein the saved collaborative document comprises the one or more edits to the collaborative document and the recording of the placement of the first video bubble overlaid on the collaborative document.

Example 33 is the method of any previous or subsequent Example, the method further comprising: establishing, by the video conference provider, a virtual meeting comprising a plurality of participants, wherein the plurality of participants comprise the first client device and the second client device; and wherein receiving, from the first client device, the request to access the collaborative document further comprises sharing the collaborative document with the plurality of participants during the virtual meeting.

Example 34 is the method of any previous or subsequent Example, wherein the method further comprises: during sharing of the collaborative document with the plurality of participants during the virtual meeting, generating, by the video conference provider, a video bubble for each of the plurality of participants in the collaborative document; modifying placement of the video bubble for each of the plurality of participants in the collaborative document based on input from each of the plurality of participants; and recording in the recording, by the video conference provider, the placement of the video bubble for each of the plurality of participants overlaid on the collaborative document.

Example 35 is a non-transitory computer-readable medium comprising processor-executable instructions configured to cause one or more processors to: receive, from a first client device, a request to access a collaborative document; transmit, to the first client device, access to the collaborative document; receive, from the first client device, a first video stream; generate a first video bubble associated with the first video stream overlaid on the collaborative document; record placement of the first video bubble overlaid on the collaborative document based on input from the first client device; and provide, to a second client device, the collaborative document along with a recording of the placement of the first video bubble overlaid on the collaborative document.

Example 36 is the non-transitory computer-readable medium of any previous or subsequent Example, wherein instructions to provide, to the second client device, the collaborative document along with the recording of the placement of the first video bubble overlaid on the collaborative document causes the processor to execute further processor-executable instructions stored in the non-transitory computer-readable medium to: responsive to the second client device accessing the collaborative document, generate a second video bubble corresponding to the second client device.

Example 37 is the non-transitory computer-readable medium of any previous or subsequent Example, wherein the second video bubble comprises a picture or logo corresponding to the second client device.

Example 38 is the non-transitory computer-readable medium of any previous or subsequent Example, wherein the processor is configured to execute further processor-executable instructions stored in the non-transitory computer-readable medium to: determine an interaction level for each of the first video bubble and the second video bubble; and determine, based on the interaction level, placement for the first video bubble and the second video bubble overlaid on the collaborative document.

Example 39 is the non-transitory computer-readable medium of any previous or subsequent Example, wherein the interaction level for the second video bubble is determined to be low and the processor is configured to execute further processor-executable instructions stored in the non-transitory computer-readable medium to: modify the placement of the second video bubble to a margin of the collaborative document.

Example 40 is the non-transitory computer-readable medium of any previous or subsequent Example, wherein the processor is configured to execute further processor-executable instructions stored in the non-transitory computer-readable medium to: determine an interaction level for each of the first video bubble and the second video bubble; and modify, based on the interaction level, a size of the first video bubble and a size of the second video bubble overlaid on the collaborative document.

That which is claimed is:

1. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
join, by a first client device associated with a first participant and executing a client application, a video conference, the video conference hosted by a video conference provider;
display, by the client application, a graphical user interface ("GUI"), the GUI displaying a first arrangement of a plurality of representations of corresponding participants in the video conference, a first representation of the one or more representations comprising a first video stream corresponding to the first participant and a second representation comprising a second video stream corresponding to a second participant and received from a second client device;
transmit, from the first client device, a request to share a collaborative document with the other participants in the video conference;
receive, by the first client device, access to the collaborative document;
in response to sharing the collaborative document during the video conference:
display the collaborative document;
change, by the client application, the GUI to generate a first video bubble associated with the second participant in the video conference, the first video bubble replacing the representation of the second participant and comprising the second video stream; and
display the first video bubble overlaid on the collaborative document.

2. The system of claim 1, wherein the processor is configured to execute further processor-executable instructions stored in the non-transitory computer-readable medium to:
generate a second video bubble associated with the first video stream within the collaborative document, the second video bubble providing the representation of the first participant.

3. The system of claim 2, wherein the processor is configured to execute further processor-executable instructions stored in the non-transitory computer-readable medium to:
determine, based on input from the first client device, placement of the second video bubble within the collaborative document;
determine, based on input from the second client device, placement of the first video bubble within the collaborative document;
modify, based on input from the first client device, the placement of the second video bubble within the collaborative document; and
modify, based on input from the second client device, the placement of the first video bubble within the collaborative document.

4. The system of claim 2, wherein the processor is configured to execute further processor-executable instructions stored in the non-transitory computer-readable medium to:

generate, by the first client device, one or more edits to the collaborative document;
track the one or more edits to the collaborative document with the second video bubble; and
update the collaborative document based on the one or more edits.

5. The system of claim 1, wherein the processor is configured to execute further processor-executable instructions stored in the non-transitory computer-readable medium to:
receive, from the second client device, a first audio stream; and
associate the first audio stream with the first video bubble within the collaborative document.

6. The system of claim 1, wherein the processor is configured to execute further processor-executable instructions stored in the non-transitory computer-readable medium to:
generate, within the collaborative document, a video bubble associated with each video stream received from the participants.

7. A method comprising:
joining, by a first client device associated with a first participant and executing a client application, a video conference, the video conference hosted by a video conference provider;
displaying, by the client application, a graphical user interface ("GUI"), the GUI displaying a first arrangement of a plurality of representations of corresponding participants in the video conference, a first representation of the one or more representations comprising a first video stream corresponding to the first participant and a second representation comprising a second video stream corresponding to a second participant and received from a second client device;
transmitting, from the first client device, a request to share a collaborative document with the other participants in the video conference;
receiving, by the first client device, access to the collaborative document;
in response to sharing the collaborative document during the video conference:
displaying the collaborative document;
changing the GUI to generate a first video bubble associated with the second participant in the video conference, the first video bubble replacing the representation of the second participant and comprising the second video stream; and
displaying the first video bubble overlaid on the collaborative document.

8. The method of claim 7, wherein the method further comprises:
determining, by the first client device, placement of the first video bubble within the collaborative document based on a first input from the second client device; and
modifying, by the first client device, the placement of the first video bubble within the collaborative document based on a second input from the second client device.

9. The method of claim 8, wherein the method further comprises:
generating, by the first client device, one or more edits to the collaborative document, wherein the one or more edits comprise input from the first client device; and
modifying the placement of the first video bubble based on the one or more edits to the collaborative document.

10. The method of claim 8, wherein the method further comprises:
saving, by the first client device, the collaborative document as a saved collaborative document, wherein the saved collaborative document comprises the one or more edits to the collaborative document and movement of the placement of the first video bubble.

11. The method of claim 7, wherein the method further comprises:
generating, by the first client device, a second video bubble associated with the first video stream within the collaborative document;
determining, by the first client device, placement of the second video bubble within the collaborative document; and
modifying the placement of the second video bubble within the collaborative document based on input from the first client device.

12. The method of claim 7, wherein the method further comprises:
during sharing of the collaborative document with the participants during the video conference, generating a video bubble for each of the participants in the collaborative document.

13. A non-transitory computer-readable medium comprising processor-executable instructions configured to cause one or more processors to:
join, by a first client device associated with a first participant and executing a client application, a video conference, the video conference hosted by a video conference provider;
display, by the client application, a graphical user interface ("GUI"), the GUI displaying a first arrangement of a plurality of representations of corresponding participants in the video conference, a first representation of the one or more representations comprising a first video stream corresponding to the first participant and a second representation comprising a second video stream corresponding to a second participant and received from a second client device;
transmit, from the first client device, a request to share a collaborative document with the other participants in the video conference;
receive, by the first client device, access to the collaborative document;
in response to sharing the collaborative document during the video conference:
display the collaborative document;
change the GUI to generate a first video bubble associated with the second participant in the video conference, the first video bubble replacing the representation of the second participant and comprising the second video stream; and
display the first video bubble overlaid on the collaborative document.

14. The non-transitory computer-readable medium of claim 13, wherein instructions to display the first video bubble causes the processor to execute further processor-executable instructions stored in the non-transitory computer-readable medium to:
responsive to the second client device accessing the collaborative document, generate the first video bubble corresponding to the second client device.

15. The non-transitory computer-readable medium of claim 14, wherein the first video bubble comprises a picture or logo corresponding to the second client device.

16. The non-transitory computer-readable medium of claim 14, wherein the processor is configured to execute further processor-executable instructions stored in the non-transitory computer-readable medium to:
generate and display a second video bubble overlaid on the collaborative document, the second video bubble providing the representation of the first participant and comprising the first video stream;
determine an interaction level for each of the first video bubble and the second video bubble; and
determine, based on the interaction level, placement for the first video bubble and the second video bubble within the collaborative document.

17. The non-transitory computer-readable medium of claim 16, wherein the interaction level for the first video bubble is determined to be low and the processor is configured to execute further processor-executable instructions stored in the non-transitory computer-readable medium to:
modify the placement of the first video bubble to a margin of the collaborative document.

18. The non-transitory computer-readable medium of claim 16, wherein the processor is configured to execute further processor-executable instructions stored in the non-transitory computer-readable medium to:
modify, based on the interaction level, a size of the first video bubble and a size of the second video bubble within the collaborative document.

* * * * *